Patented Aug. 17, 1926.

1,596,597

UNITED STATES PATENT OFFICE.

MELVIN DE GROOTE, OF ST. LOUIS, MISSOURI, ASSIGNOR TO WM. S. BARNICKEL & COMPANY, OF WEBSTER GROVES, MISSOURI, A CORPORATION OF MISSOURI.

PROCESS FOR TREATING PETROLEUM EMULSIONS.

No Drawing. Application filed October 7, 1925. Serial No. 61,135.

This invention relates to the treatment of emulsions of mineral oil and water, such as petroleum emulsions for the purpose of separating the oil from the water.

Petroleum emulsions are of the water-in-oil type and consist of oil constituting the continuous phase of the emulsion, droplets of water distributed throughout the body of oil and constituting the dispersed phase of the emulsion and films of matter that encase the droplets of water. They are obtained from producing wells and from the bottom of oil storage tanks and are commonly referred to as "cut oil", "roily oil", "emulsified oil" and "bottom settlings".

The object of my present invention is to provide a novel and inexpensive process for separating emulsions of the character referred to into their component parts of oil and water or brine.

Briefly described, my process consists in subjecting a petroleum emulsion to the action of a treating agent consisting of an ester of a naphthenic acid, in such a manner that the emulsion will "break" and separate into its component parts of oil and water or brine when the emulsion is permitted to remain in a quiescent state after treatment.

In order to give a clear understanding of the esters contemplated by my process, I will point out some of the characteristics of the naphthenes from which said esters are obtained. Naphthenes are hydrocarbons of the $C_nH_{2n}$ series which belong, not to the ethylene group, but to what is known as the naphthene or $C_nH_{2n-6}+H_6$ group. They are found in most oils and closely resemble the paraffines. Related to the naphthenes are naphthenic acids. These naphthenic acids were first obtained from soaps, salted out of the alkaline sludge obtained in the refining of illuminating oil. Said isolated acids belong to the series $C_nH_{2n-2}O_2$ and differ somewhat in their properties from the unsaturated acids derived from the series of fatty acids. However, they closely resemble the fatty acids, on account of their weak acid character. It has generally been accepted that they are mono-carboxylic derivatives of the naphthenes.

The naphthenes above referred to are capable of sulphonation, and when subjected to such action, there results therefrom a naphthene, sulphonic acid of the formulæ $C_nH_{2n-1}SO_3H$. Due to the acidic character of this material it is frequently referred to as naphthenic acid, although it should be more properly called naphthene, sulphonic acid. Petroleum sludges may also contain a true naphthenic sulphonic acid such as the series $C_nH_{2n-3}HSO_3.O_2$. It is somewhat difficult to isolate these acids from each other. Generally speaking, the sulphonated naphthene acids are produced in the refining of petroleum, and subsequently are subjected to hydrolysis to give the naphthenic acids. Usually, the method of hydrolysis is not complete and there always remain some sulphonated naphthene acids. On the other hand, in the actual refining process of washing with sulphuric acid there may be present in the sludge some unsulphonated naphthenic acid. It will thus be seen that it is almost impossible to obtain a sulphonated, naphthenic acid in the absolute absence of the unsulphonated product, and consequently, the substance commonly referred to as "naphthenic acid" is essentially a mixture of the three series above referred to.

Hereafter I shall refer to the above mentioned mixture as naphthenic acids and shall refer to those specific acids which contain a sulphonic group or groups as sulphonated, naphthenic acids. It is a matter of common knowledge that sulphonated, naphthenic acids may vary in their characteristics, such as molecular weights, odor, color, their solubility in water and their solubility in oil and in other solvents. However, they are of commercial value and are used extensively in industrial processes, such as fat splitting agents and in the production of detergents. The art of recovering these materials or their salts is well known and has been described in the following U. S. patents: Nos. 1,233,700; 1,299,385; 1,319,027; 1,396,399; 1,474,933; 1,493,111.

Esters capable of being used with my process can be obtained from naphthenic acids by combination with hydroxylated materials not derived from petroleum, such as aliphatic alcohols, including methyl alcohol, ethyl alcohol, iso-propyl alcohol and iso-butyl alcohol, and from aromatic bodies, such as phenol, cresol, naphthol, etc. The method of producing such substances is well known and consists in intimately mixing the acid containing material, such as naphthenic acid, with a molecular proportion of the hydroxyl-containing body, and subjecting the mixture to the action of a dehydrating agent, such as sulphuric acid. The acid hydrogen of either the carboxyl or of the sulphonic group may be combined with the hydroxyl.

In practising my process a treating agent of the kind above described, namely, an ester of a naphthenic acid, is brought into contact with an emulsion either by introducing the treating agent into a well in which a petroleum emulsion is being produced; introducing the treating agent into a conduit through which a petroleum emulsion is flowing; introducing the treating agent into a tank in which a petroleum emulsion is stored or introducing the treating agent into a container that holds a sludge obtained from the bottom of an oil storage tank. The treating agent can also be introduced into a producing well in such a way that it will become mixed with water and oil that are emerging from the ground before said water and oil enter the barrel of the well pump or the tubing up through which said water and oil flow to the surface of the ground. After treatment the emulsion is allowed to stand in a quiescent state at a suitable temperature so as to permit the water or brine to separate from the oil, or it may be passed through a variety of apparatus, such as hay tanks, gun barrels, etc., such as are now commonly used in the operation of "breaking" petroleum emulsions. It may even be passed through a centrifugal or electrical dehydrator.

Having thus described my invention, what I claim as new and desire to secure by Letters Patent is:

1. A process for treating petroleum emulsions, characterized by subjecting the emulsion to the action of a treating agent consisting of an ester of a naphthenic acid.

2. A process for treating petroleum emulsions, characterized by subjecting the emulsion to the action of a treating agent consisting of an ester of a sulphonated naphthenic acid.

3. A process for treating petroleum emulsions, characterized by subjecting the emulsion to the action of a treating agent consisting of an aromatic ester of a naphthenic acid.

4. A process for treating petroleum emulsions, characterized by subjecting the emulsion to the action of a treating agent consisting of a mono-cyclic ester of a naphthenic acid.

5. A process for treating petroleum emulsions, characterized by subjecting the emulsion to the action of a treating agent consisting of a phenolic ester of a naphthenic acid.

MELVIN DE GROOTE.